US006232963B1

(12) United States Patent
Tew et al.

(10) Patent No.: US 6,232,963 B1
(45) Date of Patent: May 15, 2001

(54) MODULATED-AMPLITUDE ILLUMINATION FOR SPATIAL LIGHT MODULATOR

(75) Inventors: Claude E. Tew, Dallas; Dana Dudley; Keith H. Elliott, both of Plano; Mark L. Burton, Dallas, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/152,867

(22) Filed: Sep. 14, 1998

Related U.S. Application Data

(60) Provisional application No. 60/060,433, filed on Sep. 30, 1997.

(51) Int. Cl.[7] .............................. G02B 26/08; G02F 1/31; H04N 9/31

(52) U.S. Cl. ............................ 345/204; 345/85; 345/102; 348/771

(58) Field of Search ..................................... 345/204, 102; 349/61, 68, 85

(56) References Cited

U.S. PATENT DOCUMENTS 5,122,791 * 6/1992 Gibbons et al. ..................... 340/784
5,912,651 * 6/1999 Bitzakidis et al. ..................... 345/58

FOREIGN PATENT DOCUMENTS 0 635 986 A1 1/1995 (EP) .
0 762 374 A1 3/1997 (EP) .
WO 96/19794 6/1996 (WO) .

* cited by examiner

*Primary Examiner*—Steven Saras
*Assistant Examiner*—William C. Spencer
(74) *Attorney, Agent, or Firm*—Charles A. Brill; Wade James Brady, III; Frederick J. Telecky, Jr.

(57) ABSTRACT

Methods of controlling the illumination source (18) of an SLM-based display system (10). It is assumed that the system (10) displays pixel data formatted into a bit-plane format so that all bits of the same bit-weight can be displayed simultaneously. To provide greyscale, the amplitude of the source (18) may be modulated so that bit-planes having greater bit-weights are displayed with more intense illumination than bit-planes having smaller bit-weights (FIGS. 2 and 3). To avoid visual artifacts, the duty cycle of the bit-plane display times may be shortened relative to the frame period. (FIG. 4A). The latter method can be accompanied by a shortening of the duty time of the illumination on SLM (15). (FIG. 4B). The short duty cycle method may be used together with illumination amplitude modulation, or it may be used with the PWM method of providing greyscale.

11 Claims, 2 Drawing Sheets

MODULATED-AMPLITUDE ILLUMINATION FOR SPATIAL LIGHT MODULATOR

This application claims priority under 35 U.S.C. §119 (e) (1) of provisional application No. 06/060,433 filed Sep. 30, 1997.

TECHNICAL FIELD OF THE INVENTION

The present invention relates generally to image display systems that use a spatial light modulator, and more particularly to methods of controlling the illumination source for the spatial light modulator.

BACKGROUND OF THE INVENTION

Video display systems based on spatial light modulators (SLMs) are increasingly being used as an alternative to display systems using cathode ray tubes (CRTs). SLM systems provide high resolution displays without the bulk and power consumption of CRT systems.

Digital micro-mirror devices (DMDs) are a type of SLM, and may be used for either direct-view or projection display applications A DMD has an array of micro-mechanical display elements, each having a tiny mirror that is individually addressable by an electronic signal. Depending on the state of its addressing signal, each mirror tilts so that it either does or does not reflect light to the image plane. The mirrors may be generally referred to as "display elements", which correspond to the pixels of the image that they generate. Generally, displaying pixel data is accomplished by loading memory cells connected to the display elements. After display element's memory cell is loaded, the display element is reset so that it tilts in the on or off position represented by the new data in the memory cell. The display elements can maintain their on or off state for controlled display times.

Other SLMs operate on similar principles, with an array of display elements that may emit or reflect light simultaneously, such that a complete image is generated by addressing display elements rather than by scanning a screen. Another example of an SLM is a liquid crystal display (LCD) having individually driven display elements.

To achieve intermediate levels of illumination, between white (on) and black (off), pulse-width modulation (PWM) techniques have been used. The basic PWM scheme involves first determining the rate at which images are to be presented to the viewer. This establishes a frame rate and a corresponding frame period. For example, in a standard television system, images are transmitted at 30 frames per second, and each frame lasts for approximately 33.3 milliseconds. Then, the intensity resolution for each pixel is established. In a simple example, and assuming n bits of resolution, the frame time is divided into $2^n-1$ equal time slices. For a 33.3 millisecond frame period and n-bit intensity values, the time slice is $33.3/(2^n-1)$ milliseconds.

Having established these times, for each pixel of each frame, pixel intensities are quantized, such that black is 0 time slices, the intensity level represented by the LSB is 1 time slice, and maximum brightness is $2^n-1$ time slices. Each pixel's quantized intensity determines its on-time during a frame period. Thus, during a frame period, each pixel with a quantized value of more than 0 is on for the number of time slices that correspond to its intensity. The viewer's eye integrates the pixel brightness so that the image appears the same as if it were generated with analog levels of light.

For addressing SLMs, PWM calls for the data to be formatted into "bit-planes", each bit-plane corresponding to a bit weight of the intensity value. Thus, if each pixel's intensity is represented by an n-bit value, each frame of data has n bit-planes. Each bit-plane has a 0 or 1 value for each display element. In the simple PWM example described in the preceding paragraphs, during a frame, each bit-plane is separately loaded and the display elements are-addressed according to their associated bit-plane values. For example, the bit-plane representing the LSBs of each pixel is displayed for 1 time slice, whereas the bit-plane representing the MSBs is displayed for 2n/2 time slices. Because a time slice is only $33.3/(2^n-1)$ milliseconds, the SLM must be capable of loading the LSB bit-plane within that time. The time for loading the LSB bit-plane is the "peak data rate".

As the pixel arrays of a spatial light modulator become larger and pixel resolution increases, the PWM method of providing greyscale places higher bandwidth demands on the delivery of data to the SLM. This is because the time within a frame allocated for the least significant bit becomes smaller. During this LSB display time, the pixel elements must be switched on and off very quickly and the data for the next bit must be delivered. Recent design efforts involving SLM-based displays have been directed to satisfying bandwidth requirements.

In addition to satisfying bandwidth requirements, an SLM-based display system should display its image with minimal artifacts. One potential artifact results from displays of objects in motion. The longer the time that a frame is illuminated, the more likely that a moving object will have a smeared appearance. This is a result of the fact that the viewer's retina and brain work together to integrate the display from frame to frame.

SUMMARY OF THE INVENTION

One aspect of the invention is a method of modulating the amplitude of the source illumination of an SLM. This method is an alternative to PWM of the pixel data as a means of providing greyscale images. As with PWM, the pixel data is formatted into bit-planes to be displayed during a frame period. Also, as with PWM, the frame period is divided into a number of display time intervals, where the number of time intervals is the same as the number of bits per pixel. However, when the illumination is to be amplitude modulated, the time intervals need not be of different durations and may be substantially equal. During a frame period, bit-planes are delivered to the SLM in a sequence of descending or ascending bit-weights. The SLM is illuminated with a modulated source, according to an exponential function such that during at least one time interval associated with a bit-plane having a higher bit-weight the illumination is more intense than during a time interval associated with a bit-plane having a lower bit-weight.

An advantage of amplitude modulation of the source illumination is that it eliminates the need for pulse width modulation of the pixel data. Because the display times for the bit-planes need not vary in a binary pattern, the time available to load each next bit-plane can be as long as that of all other bit-planes. In other words, there are no "short" bit-planes, whose short display times impose high bandwidth requirements on the delivery of pixel data to the SLM. In sum, the elimination of pulse width modulation avoids large peaks in the rate of data required to be delivered to the SLM. Yet, the image perceived by the viewer is integrated into a greyscale image just as is the case with pulse width modulation.

The illumination amplitude modulation method may be implemented with any illumination source, including light sources that are not easily pulsed. The source may have a continuous waveform and need not be a "high bandwidth" source such as a laser diode or LED. Instead, the source may be a high brightness but not necessarily "high bandwidth" source, such as an incandescent or plasma lamp.

Another aspect of the invention is a method of using "short duty cycle" bit sequences to avoid motion artifacts. During a frame period, the bit sequences are compressed so as to display the image during a small portion of the frame period. This limits the amount of time for imprinting the image on the observer's retina, and therefore reduces motion artifacts.

A further aspect of the invention is using "short duty cycle" illumination to match "short duty cycle" bit sequences. During a frame period, the illumination's duration is decreased to match that of the short duty cycle bit sequence but its intensity is increased. These adjustments to the illumination's duration and intensity are designed to provide a desired average brightness.

The short duty cycle illumination can be used with conventional PWM of the pixel data or it can be used in combination with amplitude modulation of the source illumination. In the latter case, the illumination is modulated according to some exponential function, but during the bit sequence's display time, the illumination is increased in intensity as well as shortened in duration.

DETAILED DESCRIPTION OF THE INVENTION

Overview of SLM Display Systems

Comprehensive descriptions of SLM-based digital display systems are set out in U.S. Pat. No. 5,079,544, entitled "Standard Independent Digitized Video System", and in U.S. patent Ser. No. 08/147,249, entitled "Digital Television System", and in U.S. patent Ser. No. 08/146,385, entitled "DMD Display System". These systems are specifically designed for use with a digital micro-mirror device (DMD), which is a type of SLM. Each of these patents and patent applications is assigned to Texas Instruments Incorporated, and each is incorporated by reference herein. Each of these systems is described in terms of providing greyscale with pulse width modulation (PWM), as described in the Background.

The present invention is directed to methods of controlling the source illumination. A first aspect of the invention is a method of amplitude modulating the source illumination to provide greyscale images. This method may be used as an alternative to PWM of the pixel data. Another aspect of the invention is a method of shortening the duty cycle of the source illumination. This method may be used in conjunction with either illumination modulation or PWM.

Figure 1:
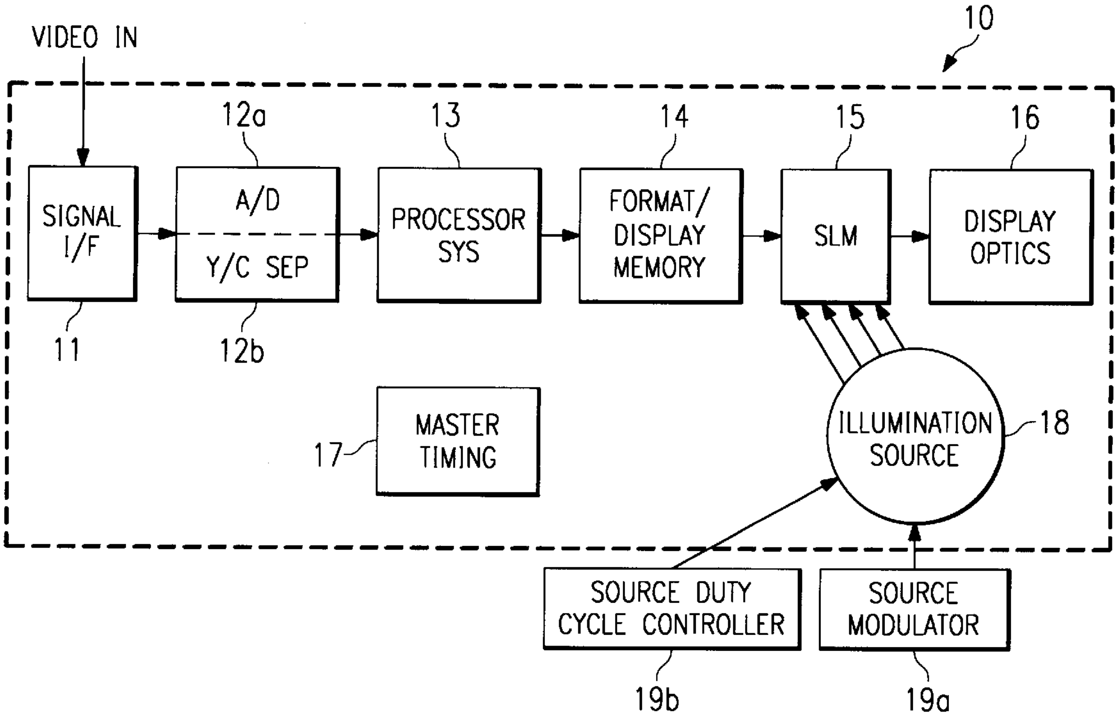
FIG. 1 is a block diagram of a typical SLM-based display system, having an illumination source that is either amplitude modulated or that has its duty cycle controlled, or both, in accordance with the invention.

FIG. 1 is a block diagram of a projection display system 10, which uses an SLM 15 to generate real-time images from an input signal, such as a broadcast television signal. In the example of this description, the input signal is analog, but in other embodiments, the input signal could be digital, eliminating the need for A/D converter 12*a*.

Only those components significant to main-screen pixel data processing are shown. Other components, such as might be used for processing synchronization and audio signals or secondary screen features, such as closed captioning, are not shown.

Signal interface unit 11 receives an analog video signal and separates video, synchronization, and audio signals. It delivers the video signal to A/D converter 12*a* and Y/C separator 12*b*, which convert the data into pixel-data samples and which separate the luminance ("Y") data from the chrominance ("C") data, respectively. In FIG. 1, the signal is converted to digital data before Y/C separation, but in other embodiments, Y/C separation could be performed before A/D conversion.

Processor system 13 prepares the data for display, by performing various pixel data processing tasks. Processor system 13 may include whatever processing memory is useful for such tasks, such as field and line buffers. The tasks performed by processor system 13 may include linearization (to compensate for gamma correction), colorspace conversion, and interlace to progressive scan conversion. The order in which these tasks are performed may vary.

Display memory 14 receives processed pixel data from processor system 13. It formats the data, on input or on output, into "bit-plane" format, and delivers the bit-planes to SLM 15. As discussed in the Background, the bit-plane format permits each display element of SLM 15 to be turned on or off in response to the value of one bit of data.

In a typical display system 10, display memory 14 is a "double buffer" memory, which means that it has a capacity for at least two display frames. The buffer for one display frame can be read out to SLM 15 while the buffer for another display frame is being written. The two buffers are controlled in a "ping-pong" manner so that data is continuously available to SLM 15.

The bit-plane data from display memory 14 is delivered to SLM 15. Although this description is in terms of a DMD-type of SIM 15, other types of SLMs could be substituted into display system 10. Details of a suitable SLM 15 are set out in U.S. Pat No. 4,956,619, entitled "Spatial Light Modulator", which is assigned to Texas Instruments Incorporated and incorporated by reference herein. In the case of a DMD, each pixel of the image is generated by a display element that is a mirror tilted to either an on or an off position.

Essentially, SLM 15 uses the data from display memory 14 to address each display element. The "on" or "off" state of each display element forms a black or white pixel. An array of display elements is used to generate an entire image frame. In the embodiment of this invention, each display element of SLM 15 has an associated memory cell to store its bit from a particular bit-plane.

Display optics unit 16 has optical components for receiving the image from SLM 15 and for illuminating an image plane such as a display screen. For color displays, the display optics unit 16 includes a color wheel, to which a sequence of bit-planes for each color are synchronized. In an alternative embodiment, the bit-planes for different colors could be concurrently displayed on multiple SLMs and combined by the display optics unit.

Master timing unit 17 provides various system control and timing functions.

Illumination source 18 provides illumination to the surface of the SLM 15. As explained below, the amplitude of the illumination from source 18 may be modulated by means of a source modulator 19*a*. Source 18 may also (or alternatively) be controlled by a duty cycle controller 19*b*, which shortens its duty cycle during one or more bit-planes.

Illumination Amplitude Modulation

Figure 2:
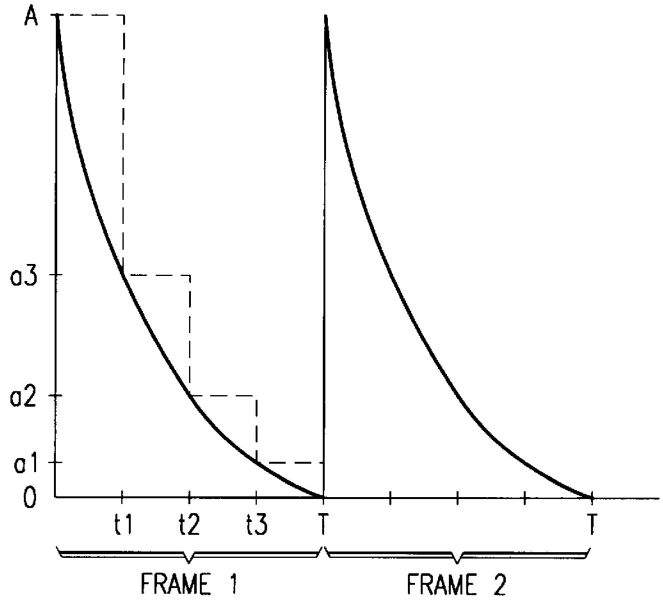
FIG. 2 illustrates an example of a method of modulating the illumination source of FIG. 1.

FIG. 2 illustrates an example of an amplitude modulation scheme for illumination source 18. The solid line represents the continuous time, continuous amplitude (analog) output of source 18. The time periods from 0 to T1, T1 to T2, etc., each represent a frame period. The amplitude values 0 to A represent the amplitude range of source 18 during a frame period.

In the example of FIG. 2, at the beginning of each frame, source 18 is turned on at its brightest amplitude. The amplitude is decreased until it has a value of zero at the end of the frame. As explained below, the decrease in amplitude follows a modulated waveform, where the modulation is exponential. The modulated waveform can be divided into equal time segments, each of whose amplitude segments can be integrated in a binary-weighted sequence.

The integrated segments of the continuous waveform are illustrated by the dashed waveform. This waveform is. a representation of the output of source 18 in discrete time, discrete amplitude segments. The integrated value of the continuous output between times 0 and t1 is represented by amplitude level A, between time t1 and t2 by a3, etc. In this manner, the output between all time intervals may be integrated and assigned numerical values, such that the amplitude is equivalent to following binary-weighted sequence:

A 8 a3 4 a2 2 a1 1

These amplitude values assume a pixel "depth" of 4 bits, where a pixel value of binary 1111 (15) is the maximum pixel value and is therefore the maximum brightness value.

As is the case with PWM, each bit of a pixel value is assigned a bit-plane value. However, with the amplitude modulation method of FIG. 2, each bit-plane is displayed for the same amount of time. The illumination amplitude for that bit-plane varies from that of other bit-planes. Thus, for example, the MSB is displayed with the greatest illumination amplitude, and the LSB with the lowest amplitude. In the example of FIG. 2, the MSB would be displayed with an amplitude level 8 and the LSB would be displayed with an amplitude level 1. In other words, any pixel value of 1xxx (MSB=1) would result in the pixel being on during the time interval 0 to t1 and perhaps for additional time intervals as determined by the other bit values. Likewise, any pixel value of xxx1 (LSB=1) would result in the pixel being on for the time interval t3 to t4 and perhaps for additional time intervals as determined by the other bit values. A pixel value of 0000 would result in the pixel being off from 0 to T1.

In operation, the bit-planes of a frame are delivered to the SLM 15 for display successively. In the example of FIG. 2, the bit-plane for the MSB is delivered first, then the next bit-plane, etc. Each bit-plane is displayed by turning all pixels either on or off as determined by their bit values (0=off, 1=on). For example if a pixel value were 1010, it would be on from 0 to t1, then off until t2, then on until t3, then off until the beginning of the next frame. The total brightness for that pixel during the frame would be 8+2 =10.

Figure 3:
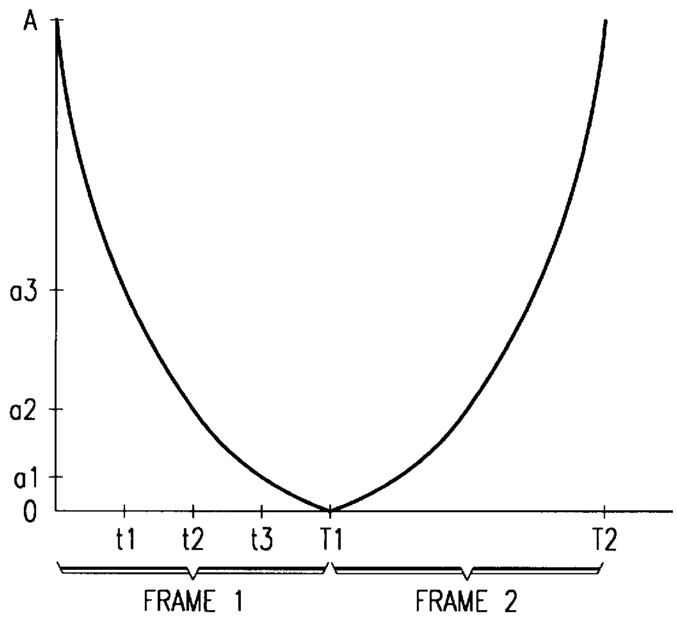
FIG. 3 illustrates an alternative example of a method of modulating the illumination source of FIG. 1.

FIG. 3 illustrates an alternative waveform for modulating source 18. The first frame is modulated in the manner described above. However, at the beginning of the second frame, instead of switching source 18 back to its brightest level,. the amplitude is exponentially increased until it once again reaches its maximum brightness at the end of the second frame. Thus, the modulation is alternately "inverted" alternatives from frame to frame, going from max to min, min to max, max to min, etc.

The examples of FIG. 2 and 3 are for 4-bit pixel data. However, the same concept is applicable to displays of any pixel resolution. In general, the modulation provides an illumination waveform that is exponentially varying. When the time intervals are to be equal, the waveform's time constant is such that the illumination goes from its full value to a zero or near zero value in the same number of time constants as the number of bits per pixel.

In FIG. 2, the exponential function that represents the modulated illumination is of the form:

$$y=e^{-x}$$

where the function is divided into equal time intervals, t. For a normalized function, at the end of the first time interval, y=0.5. The integrals of each section have binary weights, that is the light delivered is:

$$\left|\int_0^{t1} y\,dt\right|=\left|2\int_{t1}^{t2} y\,dt\right|=\left|4\int_{t2}^{t3} y\,dt\right|=\left|8\int_{t3}^{t4} y\,dt\right|, \text{etc.}$$

The function is referred to here as a "binary integral exponential function". When the function is negative as in FIG. 2, the bit-planes are delivered to SLM 15 in descending order of their bit-weights. To synthesize the function, $x=t/\tau$, where t is time and $\tau$ is the RC or time constant of the drive circuitry. Alternatively, the function could be positive (having a positive exponent) and the bit-planes would be delivered in ascending order of their bit-weights.

In general, the illumination may be modulated by any exponential function of the form:

$$y=a^x$$

The integrals of the function during its time intervals need not follow a binary pattern. Also, the time intervals need not be equal. For example, it might be determined that a certain bit-plane should be weighted slightly to achieve some desired visual effect.

In other embodiments, the modulation function might not be exactly continuous as in FIGS. 2 and 3. In fact, it may range anywhere from being continuous to being a discrete time function. Or, it could be some combination, such that it has a trapezoidal shape. Finally, the function could be all or partly linear. The common characteristic of all embodiments is that the illumination is modulated so that at least one bit-plane is illuminated with a greater intensity than another bit-plane of lesser bit-weight.

The above-described modulation waveforms can be achieved with any light source. Solid state sources, such as light emitting diode or laser diode sources, can be modulated as described above. For brighter displays, incandescent or high-intensity discharge lamps can be used. Two examples of suitable sources are metal halide and xenon arc lamps.

Short Duty Cycles for Display Times and Source Illumination

As explained in the Background, for pulse width modulation (PWM), the pixel data is formatted into bit-planes, each of which comprises all bits of the same bit weight for all pixels. For n-bit pixel data, there are n bit-planes. In other words, the-bit-planes have varying display times depending on their associated bit-weights. Typically, the distribution of display times follows a binary pattern.

Figure 4A:
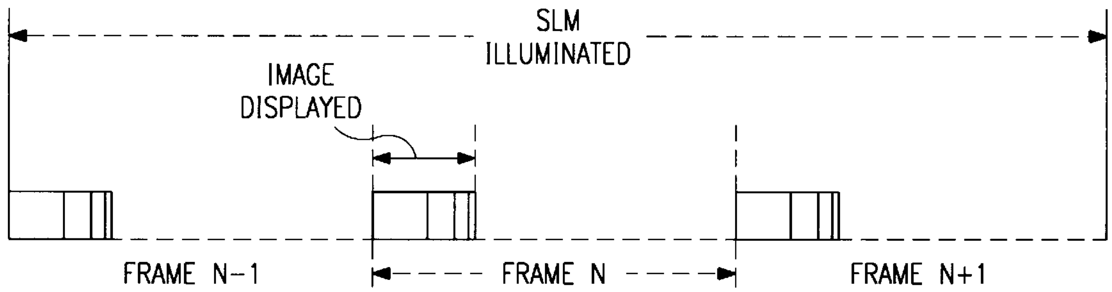
FIGS. 4A and 4B illustrate, respectively, a method of adjusting the duty cycle of the bit sequences so that their duty cycle is short relative to the frame period, and a method of controlling the duty cycle of the illumination to match the short duty cycle bit sequence.
Figure 4B:
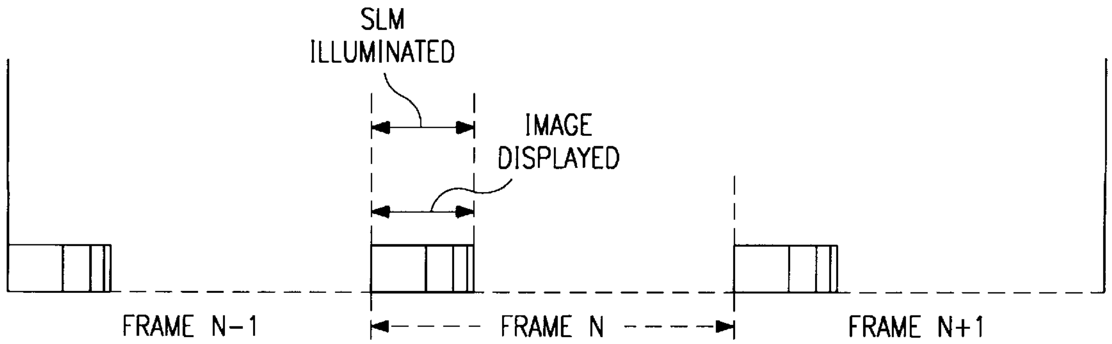

FIGS. 4A and 4B illustrate another aspect of the invention—an application of the notion that only a small portion of the frame period need be used to display the bit-planes. This "short duty cycle" method reduces visual artifacts due to image motion. This is because of the shortened amount of time taken to imprint an image on the viewer's retina.

FIG. 4A illustrates how the duty cycle of the bit-plane display time may be shortened relative to the frame period. The display times of all bit-planes are compressed into a small portion of the frame. When the bit-planes are not being displayed the SLM 15 is turned off by placing all mirror elements in their off position. In the example of FIG. 4A, SLM 15 is illuminated during the entire frame period even though it is off for most of the frame period. The total amount of light that is presented to the viewer can be compensated by increasing the illumination amplitude. The amount of brightness required for such compensated can be determined by modeling, calculation, or experimentation.

FIG. 4B illustrates how the illumination source 18 can be shuttered or switched so that SLM 15 is illuminated only during the short time that the bit-planes are being displayed. This enhances image contrast. Again, the total illumination presented to the user can be compensated by increasing the illumination amplitude.

As an example, assume a frame rate of 60 frames per second, which results in a frame period of approximately 16+ milliseconds. As in both FIGS. 4A and 4B, rather than using the entire frame period to display the bit-planes, their display times can be compressed to fit into 4 milliseconds of the frame period. This is a duty cycle of approximately 25%. As in FIG. 4B, providing a short duty cycle for both display times and illumination (by not illuminating SLM 15 during the remaining 75% of the frame period) will improve the contrast ratio. Also, by increasing the brightness of source 18 by a factor of 4 and decreasing the illumination time to match the 25% duty cycle, the average brightness of the image can be made to be the same as if the illumination were continuous and constant.

For providing short duty cycle illumination, source 18 could be mechanically or electronically shuttered. As an alternative, source 18 could be a source that permits pulsing. Solid state devices, such as LED's and laser diodes have this characteristic, but other sources, such as a pulsed xenon lamp could be used.

The short duty cycle method can be used to display either PWM pixel data (where the illumination is a constant amplitude) or "constant display time" pixel data (where the illumination is modulated as discussed above in connection with FIGS. 1–3). For example, referring again to FIG. 2, the illumination could be varied during the bit-plane display times, with brighter illumination for bit-planes having a greater bit-weight.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An illumination amplitude modulation method of displaying greyscale images using a spatial light modulator, where the images are represented by bit-planes of pixel data to be displayed during a frame period, comprising the steps of:

dividing said frame period into a number of display time intervals of substantially equal duration, where the number of display time intervals is the same as the number of bits per pixel;

delivering said bit-planes to said spatial light modulator in a sequence within said frame period; and illuminating said spatial light modulator during said frame period to deliver light having an intensity that varies with time according to a binary integral exponential function over the display time intervals.

2. The method of claim 1, wherein said illuminating step is performed by modulating a solid state illumination device.

3. The method of claim 1, wherein said illuminating step is performed by modulating an incandescent illumination source.

4. The method of claim 1, wherein said illuminating step is performed by modulating an arc lamp source.

5. The method of claim 1, wherein said bit-planes are delivered in ascending order of their bit weights and wherein the illuminating step delivers light in a manner that increases in intensity over the frame period.

6. The method of claim 1, wherein said bit-planes are delivered in descending order of their bit weights and wherein the illuminating step delivers light in a manner that decreases in intensity over the frame period.

7. The method of claim 1, wherein the delivering step delivers said bit-planes to said spatial light modulator in a sequence within a portion of said frame period such that the display time of said sequence has a duty cycle that is shorter than that of said frame period;

and wherein said illuminating step illuminates said spatial light modulator only a part of said frame period.

8. The method of claim 7, wherein said illuminating step is accomplished by switching an illumination source.

9. The method of claim 7, wherein said illuminating step is accomplished by shuttering a light source.

10. The method of claim 7, wherein said illuminating step is accomplished with a solid state illumination source.

11. An illumination amplitude modulation method of displaying greyscale images using a spatial light modulator, where the images are represented by bit-planes of pixel data to be displayed during a frame period comprising the steps of:

dividing said frame into a number of display time intervals, where the number of display time intervals is the same as the number of bits per pixel;

delivering said bit-planes to said spatial light modulator in a sequence within said frame period;

illuminating said spatial light modulator with light having an intensive that varies with time during each frame period, wherein the light intensity increases and decreases in alternating frame periods.

* * * * *